United States Patent Office 2,876,091
Patented Mar. 3, 1959

2,876,091

METHOD OF REDUCING IRON OXIDE

Thomas F. Reed, Pittsburgh, Pa., assignor to United States Steel Corporation, a corporation of New Jersey No Drawing. Application December 31, 1957
Serial No. 706,269

2 Claims. (Cl. 75—26)

This invention relates to an improved method of directly reducing iron oxide.

In a typical direct reduction process, iron oxide fines are treated in one or more fluidized beds with a reducing gas such as hydrogen, carbon monoxide or mixtures thereof, and at an elevated temperature. A minimum temperature of about 1200 F. is required for a rapid reducing reaction, but particles of some oxides "stick" at such temperatures and fluidization stops. The sticking tendency is most pronounced in mill scale or ores of high purity which contain little gangue material. Such oxides have been reduced successfully only at lower temperatures of perhaps 1100 F., at which the reactions are undesirably slow. I am aware of previous attempts to reduce high purity oxides at higher temperatures by first mixing gangue material such as silica therewith, but these attempts have been uniformly unsuccessful.

An object of the present invention is to provide an improved method of reducing high purity iron oxides in fluidized beds at temperatures exceeding 1200 F. without sticking.

A more specific object is to provide an improved reducing method in which iron oxide of high purity is mixed with high gangue iron ore to avoid sticking when reduced at higher temperatures.

According to my method, relatively pure iron oxide fines, such as mill scale or ore containing less than 2 percent by weight gangue, are mixed with high gangue iron ore fines to produce a mixture whose gangue content is at least two percent but preferably no higher than 3 percent. For purposes of describing and claming my invention, I define "high gangue iron ore" as any naturally occurring iron ore which contains 5 to 25 percent by weight silicious gangue, but preferably at least 10 percent, specifically excluding artificial mixtures of similar chemical content. To maximize the quantity of relatively pure iron oxide that can be used to produce a 2 to 3 percent gangue mixture, it is desirable to use a high gangue ore whose gangue content is in the upper portion of the foregoing range. A mixture formed in accordance with my invention can be reduced in fluidized beds at temperatures of 1200 F. up to as high as 1400 without sticking. This beneficial result is quite unexpected, since it is not attained by mixing straight gangue material or even low grade ores, such as taconite, with high purity iron oxide. I cannot explain the reason for the result, other than to observe that the form in which gangue material exists in high gangue iron ore apparently is critical in preventing sticking.

As a specific example of my method, a high purity Venezuelan ore which contains 0.5 percent of silica plus alumina, 0.4 percent combined water, and the balance substantially pure hematite, by itself can be reduced at a maximum temperature of about 1100 F. without sticking. I mixed a first sample of this ore with a typical Mesabi ore having a gangue content of about 10 percent to produce a mixture having a gangue content of about 2 percent. I mixed a second sample of the high purity ore with another Mesabi ore having a gangue content of about 6 percent again to produce a mixture having a gangue content of about 2 percent. I was able to reduce both mixtures to metallic iron in fluidized beds maintained at 1300 F. without sticking.

While I have described only a preferred way of practicing my invention, it is apparent modifications may arise. Therefore I do not with to be limited by the disclosure, but only by the scope of the appended claims.

I claim:

1. A method of reducing high purity iron oxide fines which tend to stick when heated above 1100 F. in the presence of a reducing gas comprising mixing said fines with high gangue iron ore fines having a silicious gangue content of 5 to 25 percent by weight to produce a mixture having a gangue content of 2 to 3 percent by weight, introducing said mixture to a fluidized bed maintained at a minimum temperature of 1200 F., and introducing a reducing gas to the bed.

2. A method as defined in claim 1 in which said high gangue iron ore fines have a gangue content of 10 to 25 percent and said bed is maintained at a temperature of 1300 to 1400 F.

References Cited in the file of this patent

UNITED STATES PATENTS

| | | |
|---|---|---|
| 2,758,021 | Drapeau et al. | Aug. 7, 1956 |
| 2,807,536 | O'Malley | Sept. 24, 1957 |